(12) United States Patent
Olsen

(10) Patent No.: US 9,746,122 B2
(45) Date of Patent: Aug. 29, 2017

(54) MACHINE FOOT WITH LOCKING SPINDLE AND USE

(71) Applicant: NGI A/S, Nørresundby (DK)

(72) Inventor: Tomas Hecht Olsen, Nørresundby (DK)

(73) Assignee: NGI A/S (DK)

( * ) Notice: Subject to any disclaimer, the term of this patent is extended or adjusted under 35 U.S.C. 154(b) by 0 days.

(21) Appl. No.: 15/025,107

(22) PCT Filed: Sep. 17, 2014

(86) PCT No.: PCT/DK2014/050288
§ 371 (c)(1),
(2) Date: Mar. 25, 2016

(87) PCT Pub. No.: WO2015/055205
PCT Pub. Date: Apr. 23, 2015

(65) Prior Publication Data
US 2016/0223125 A1    Aug. 4, 2016

(30) Foreign Application Priority Data

Oct. 15, 2013  (DK) .................................. 2013 00588
Apr. 8, 2014   (DK) .................................. 2014 00201

(51) Int. Cl.
*F16M 11/00*   (2006.01)
*F16M 7/00*    (2006.01)
(Continued)

(52) U.S. Cl.
CPC ........... *F16M 7/00* (2013.01); *F16C 11/0619* (2013.01); *F16C 13/00* (2013.01); *F16M 11/14* (2013.01); *F16M 2200/08* (2013.01)

(58) Field of Classification Search
CPC ...... F16M 7/00; F16M 2200/08; F16M 11/10; F16M 11/24; F16M 13/00; F16M 11/22; F16M 11/00; F16M 11/18; F16M 11/28; F16M 11/046; F16M 2200/024; F16M 11/16; F16M 11/42; F16M 11/32; F16M 13/02; A47C 7/002; A47C 7/004; A47C 3/30; A47C 19/024; A47C 7/008; A47C 3/24; A47C 19/045; A47C 3/38;
(Continued)

(56) References Cited

U.S. PATENT DOCUMENTS 1,102,792 A   7/1914   Patton
5,842,678 A   12/1998  Svejkovsky
(Continued)

FOREIGN PATENT DOCUMENTS

DK    176705    3/2009

*Primary Examiner* — Steven Marsh
(74) *Attorney, Agent, or Firm* — Ware, Fressola, Maguire & Barber LLP

(57) ABSTRACT

The invention is directed to a machine foot, which includes a top part provided with a lock nut, which is mounted in a thread on a spindle, where the lock nut has an abutment complementary shaped to the housing of the lower part, which abutment forms a section of a sphere, and where there is a first gasket between the spindle and lock nut and where there is a second gasket between housing and lock nut. With the invention is achieved that the lower parts and top parts can be produced and stocked as separate and independent units, which for example are not assembled to a finished product until after order.

12 Claims, 3 Drawing Sheets

(51) Int. Cl.
*F16C 11/06* (2006.01)
*F16C 13/00* (2006.01)
*F16M 11/14* (2006.01)

(58) Field of Classification Search
CPC .. A47C 3/18; A47C 4/02; A47C 7/006; A47C 3/04; A47C 5/12; A47C 13/005; A47C 3/20; A47C 15/004
USPC ................ 248/188.2, 188.4, 188.8, 673, 677
See application file for complete search history.

(56) References Cited

U.S. PATENT DOCUMENTS

| | | | |
|---|---|---|---|
| 2001/0019096 A1* | 9/2001 | Andreoli | F16M 7/00 248/188.8 |
| 2002/0008187 A1 | 1/2002 | Ganter | |
| 2002/0109054 A1* | 8/2002 | Burr | F16M 7/00 248/188.4 |
| 2003/0146355 A1* | 8/2003 | Burr | F16M 7/00 248/188.4 |
| 2004/0262467 A1* | 12/2004 | Burr | F16M 7/00 248/188.4 |
| 2009/0278003 A1* | 11/2009 | Chiang | A47B 91/026 248/188.4 |
| 2010/0127151 A1 | 5/2010 | Lillienskjold | |

* cited by examiner

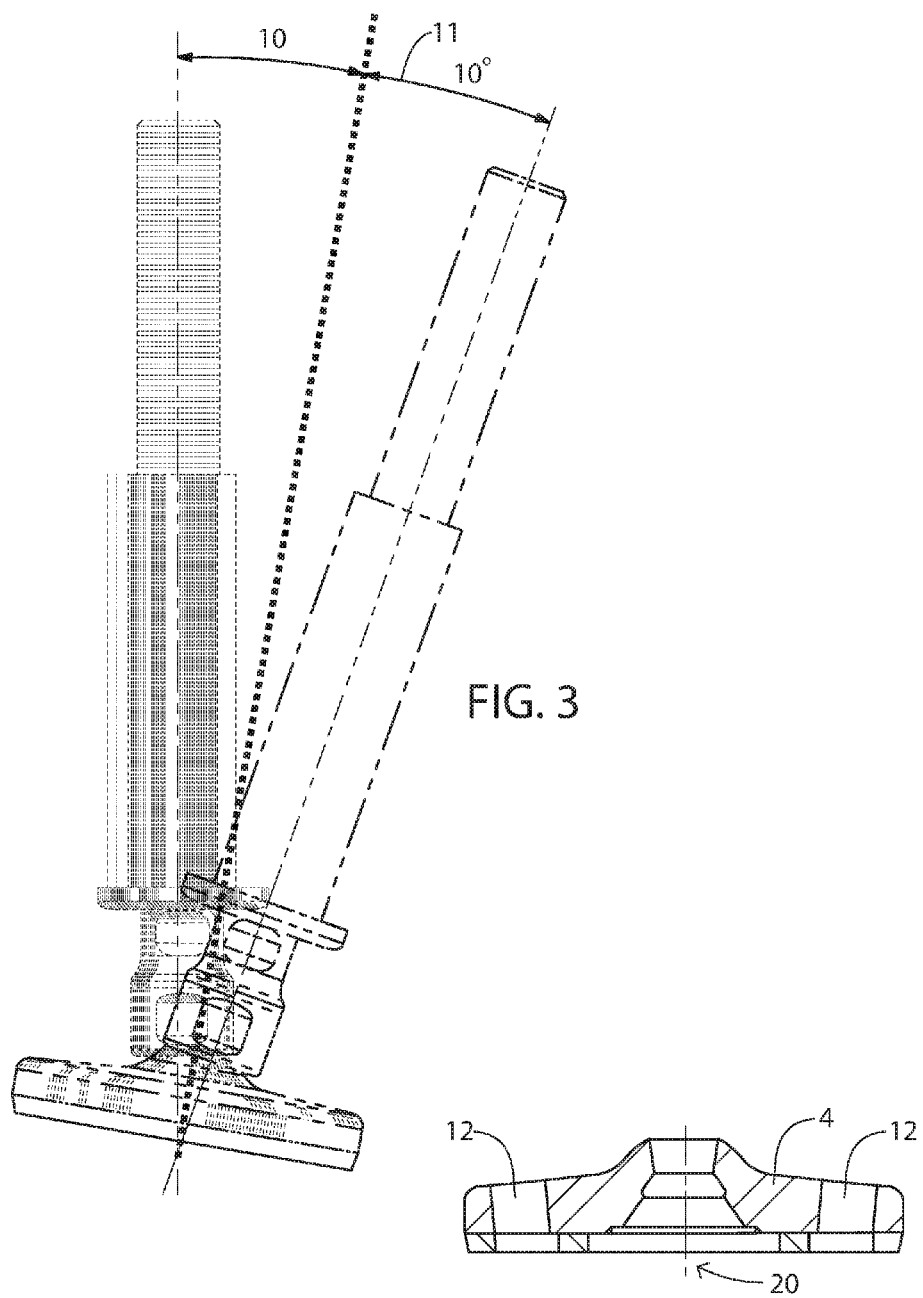

MACHINE FOOT WITH LOCKING SPINDLE AND USE

CROSS-REFERENCE TO RELATED APPLICATIONS

This application is a U.S. national state of International Appl. No. PCT/DK2014/050288 filed 17 Sep. 2014, which claimed priority to Danish Appl. Nos. PA 2013 00588 filed 15 Oct. 2013 and PA 2014 00201 filed 8 Apr. 2014, which applications are incorporated herein by reference in their entireties.

TECHNICAL FIELD

The invention relates to a machine foot, which comprises a top part for attachment in a device such as a machine and a lower part for contacting against a foundation such as a floor, where the center axis of the top part is movable a number of degrees in relation to the center axis of the lower part, and where the lower part comprises a housing, and where the top part includes a threaded spindle and a thread shield, that the top part is provided with a lock nut, which is mounted in a thread of the spindle, where the lock nut has an abutment complementary shaped to the housing of the lower part, which abutment forms a section of a sphere.

The invention moreover relates to the use of the machine foot.

BACKGROUND

From DK176705 B1 is known a machine foot, which is well-suited to be used in places with high hygiene standards.

This machine foot comprises a top part for attachment in a device such as a machine and a lower part for contacting against a foundation such as a floor, where the center axis of the top part is movable a number of degrees in relation to the center axis of the lower part, and where the lower part comprises a housing, which preferably is made from a metal, and which at the bottom is provided with a polymeric material, and where the top part includes a threaded spindle and a thread shield.

The one from DK176705 B1 is characterized in that the lower part and the top part can be made and stocked as separate units that are not assembled until after a specific order, which is expedient as a finished, assembled machine foot physically is a relatively voluminous component, that requires space and thus is relatively costly to stock.

The top part and bottom part of the machine foot are assembled by inserting the top part into the bottom part.

It is however a disadvantage of the machine foot known from DK176705 B1 that the top part of the structure cannot be locked at angle in relation to the lower part, which often is a requirement in areas having high risk of earthquakes.

From US 2002/0008187 A1 (Ganter) 2002 Jan. 24 is known a machine foot, which comprises a top part for attachment in a device such as a machine, and a lower part for contacting against a foundation such as a floor, where the center axis of the top part is movable a number of degrees in relation to the center axis of the lower part, and where the lower part comprises a housing, which is made from metal, and which at the bottom is provided with a polymeric material formed as a ring that surrounds a bolt, which is screwed into the top part from the bottom.

However there is some disadvantages of the machine foot described in US 2002/0008187 A1, among these that the bolt, which is screwed into the top part from the bottom and thus attaches the top part to the bottom part, is embedded in the polymeric material, which thus can be damaged in case a tension between the top part and the bottom part occurs. In case the polymeric material is damaged in this way the top part and bottom part will afterwards not be assembled in a well-defined way, whereby cracks can arise between the parts, in which impurities and bacteria can gather. The machine foot can therefore not be approved for use in applications that have particular hygiene standards. The top part cannot be locked in relation to the lower part, which often can be a requirement to be able to cope with high displacement tensions and thereby minimize the risk of column deflection in areas having risk of earthquakes.

The embedding of the bolt in the polymeric material results as mentioned the disadvantage that the machine foot is not able to resist a physical tension between top part and bottom part. This, and the lack of locking of the top part, means that the machine foot is not usable in applications wherein there for example is risk of earthquakes. For the same reason the machine foot is not provided with means for attachment of the machine foot against the support.

In the machine foot described in US 2002/0008187 A1 there is an open gap between the bolt, which is screwed in the top part and the base from the bottom, whereby impurities and bacteria can gather in the open gap.

Furthermore, the machine foot mentioned in US 2002/0008187 A1 does not comprise seals between top part and bottom part, and can therefore be contaminated by impurities and bacteria in this area.

There are thus disadvantages of the machine foot known from US 2002/0008187 A1, as it cannot be approved for use at locations, where there is risk of earthquakes, which can cause huge tensions and displacement tensions in machine feet that are attached to a foundation by means of fastening with bolts, just as the machine foot cannot be approved for use in applications, which set out special hygiene standards.

From U.S. Pat. No. 1,102,792 is known a machine foot as mentioned in the opening paragraph. The design does not prevent that impurities and bacteria enter into the machine foot, as it does not comprise seals to prevent that.

SUMMARY OF THE INVENTION

It is thus an object of the invention to provide a machine foot without the above-mentioned disadvantages.

The object of the invention is realized by a machine foot including a top part for attachment in a device, and having a threaded spindle, a thread shield and a lock nut mounted in a thread of the threaded spindle, and a lower part for contacting against a foundation, and having a housing. The center axis of the top part is movable a number of degrees in relation to the center axis of the lower part, and the lock nut has an abutment complementary shaped to the housing of the lower part, which abutment forms a section of a sphere. The machine foot has a first gasket between the spindle and the lock nut and a second gasket between the housing and the lock nut.

In this way it thus becomes possible to manufacture top parts and lower parts as independent components, which likewise can be stocked as separate units, which are not assembled to a specific unit until after order, at the time as the machine foot can be assembled by means of a bolt that is introduced from the lower part to the top part, whereby the machine foot can resist a high tension. After mounting of for example a bolt a plug can be mounted, whereby the machine foot is hermetically closed and thereby suited for use in applications, which has high hygiene standards. By furthermore being able to lock the top part in relation to the lower part by means of a lock nut is achieved that the risk of column deflection in connection with application in areas having high risk of earthquakes is reduced, and that requirement for locked machine feet in these areas are met. The lock nut is mounted with gaskets, which prevents that dirt and bacteria enter around the lock nut, so that both hygiene standards and locking of machine feet can be met.

Other expedient embodiments of the machine foot are show and described below.

In a further aspect of the invention, the machine foot comprises that the lock nut comprises means that are adapted to lock the angle between the center axis of the top part in relation to the center axis of the lower part, which means comprises a complementary shaped abutment against the housing and a friction provided between the lock nut and the housing. Hereby is achieved that the risk of column deflection is minimized.

In a further aspect of the invention, the machine foot comprises that the lock nut comprises means that are adapted to lock the rotation of the top part in relation to the lower part, which means comprises a complementary shaped abutment against the housing and a friction provided between the lock nut and the housing and a friction provided between the lock nut and the thread of the spindle. Hereby it is achieved that the spindle cannot rotate in relation to the lower part and hereby that the supporting machine maintains the same height.

In a further aspect of the invention, the machine foot comprises that the top part is attached to the housing with a bolt, where there between the head of the bolt and the housing is placed a partly spherical ring, the center of which is the center of rotation for the movement of the top part in relation to the lower part. Hereby it is achieved that the top part rotates about the center of the partly spherical ring.

In a further aspect of the invention, the machine foot comprises that at the bottom the housing is provided with a polymeric material. Hereby is achieved that no dirt and bacteria enter from below.

In a further aspect of the invention, the machine foot comprises that the head of the bolt is covered by a cover plate that preferably is made from a metallic material, and abuts against a recess in the housing, and where the polymeric material is shaped as a ring, which surrounds a plug that is attached to the housing by gluing to a ring-shaped contact surface of the periphery of the plug, and where the plug has an upper surface that abuts against the cover plate. Hereby it is achieved that there is hermetically closed to the bolt.

In a further aspect of the invention, the machine foot comprises that there is a clearance zone between the bolt and the housing in the lower part, which clearance zone is formed by a cavity, which is delimited on the outer side of the housing and on the inner side of the bolt. Hereby it is achieved that the bolt, and thereby the top part, is movable in relation to the housing, and thereby to the lower part.

In a further aspect of the invention, the machine foot comprises that all gaskets in the machine foot consist of FDA approved NBR rubber material.

In a further aspect of the invention, the machine foot comprises that the thread shield is provided with a welding flange placed at the bottom on the thread shield. Hereby it is achieved that the supported machine can be mounted further downwards, so that the risk of column deflection is reduced.

In a further aspect of the invention, the machine foot comprises that the plug is made of a polymeric material. Hereby is achieved a seal, which can be approved for use at locations having high hygiene standards, such as locations for processing foodstuffs or manufacturing of medicine.

In a further aspect of the invention, the machine foot comprises that the plug is circular.

In a further aspect of the invention, the machine foot comprises that the thickness of the plug is less than the thickness of the surrounding polymeric material.

In a further aspect of the invention, the machine foot comprises that the common thread faces of the bolt and the top part are provided with a glue. Hereby it is achieved that the bottom part has a robust and stable tensioning to the top part.

In a further aspect of the invention, the machine foot comprises that the polymeric material is a rubber attached to the housing by means of vulcanization. Hereby it is achieved that the attachment of the polymeric material to the housing is optimal, just as the attachment ensures that no dirt and or bacteria can enter into the machine foot via the bottom.

In a further aspect of the invention, the machine foot comprises that the lower part is provided with a number of holes, preferably two holes, for attachment of the machine foot to a foundation. Hereby it is achieved that the machine foot can be used at locations having requirements to attachment to a foundation.

In a further aspect of the invention, the machine foot comprises that all metal objects have direct metallic contact under pressure. Hereby it is achieved that there is the same electric potential in all metal objects, which removes the risk of sparks.

In a further aspect of the invention, the machine foot comprises that an anti-friction disc is placed between the housing and the spindle. Hereby it is achieved that the spindle is movable in relation to the housing without risking galling of the contacting metal between the two items.

As mentioned the invention also relates to the use of above-mentioned machine foot at locations with high hygiene standards, such as locations for processing of foodstuffs or manufacturing of medicine.

The invention moreover relates to the use of the machine in areas having high risk of earthquakes.

BRIEF DESCRIPTION OF THE DRAWINGS

The invention will hereafter be explained in detail with reference to the drawings, wherein:

FIG. 3 shows a machine foot of the same kind as the one shown in FIGS. 1 and 2.

FIG. 4 shows a sectional view of a part of the parts that is included in the lower part.

DETAILED DESCRIPTION OF THE INVENTION

Figure 1:
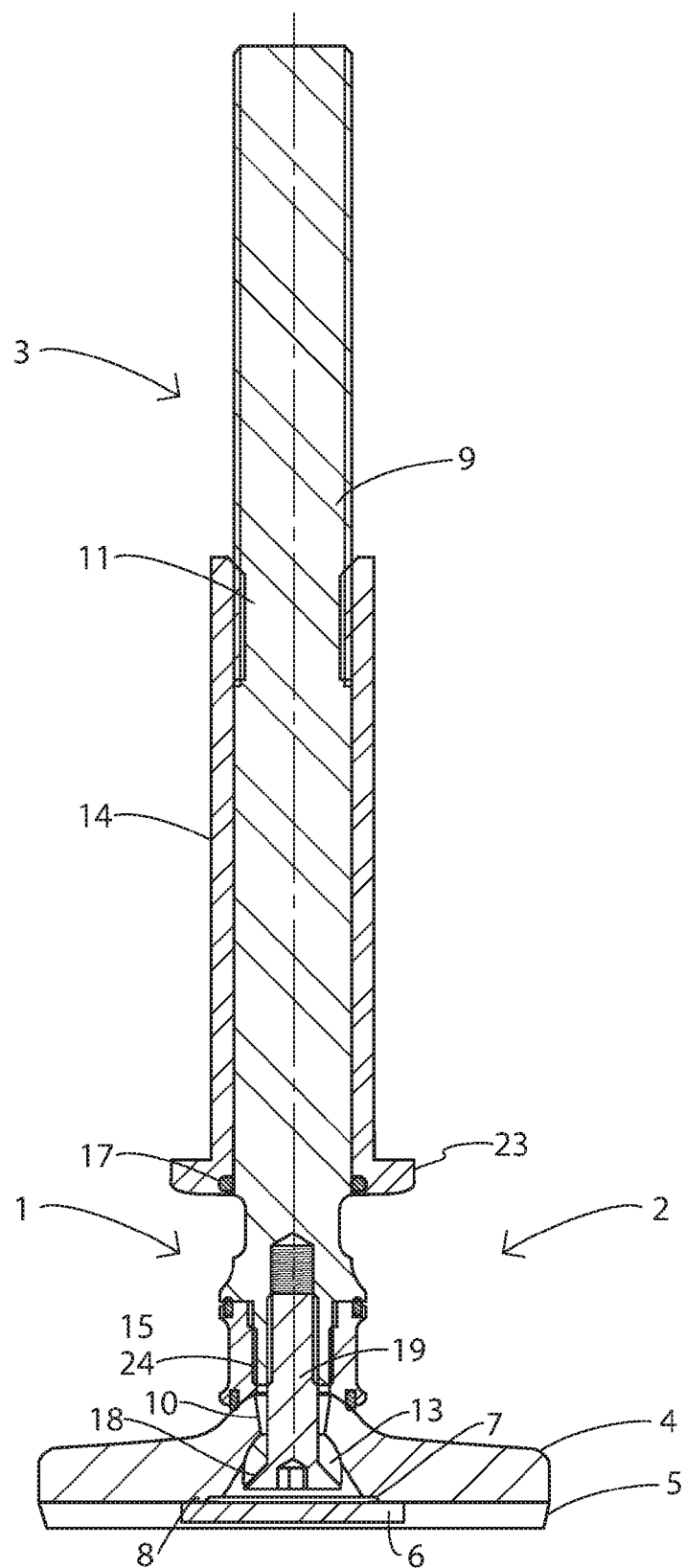
FIG. 1 shows a sectional view of a machine foot comprising a top part and a bottom part.

On FIG. 1 is shown a machine foot (1) that comprises a bottom part (2) and a top part (3).

In FIG. 3 is shown that the machine foot (1) is constructed so that the top part (3) can be turned a number of degrees (11) in relation to the center axis (20) of the bottom part (2).

In FIG. 4 is shown the housing (3) in the lower part, wherein there are two holes (12) for attachment with bolts in the foundation.

The bottom parts (2) shown in FIG. 1 to FIG. 4 comprise a housing (4) that preferably is made from a metallic material, and that in the bottom is provided with a polymeric material (5), which is shaped as a ring that surrounds a plug (6) that is attached to the housing (4) by being glued to an annular contact surface (8) of the periphery of the plug (6).

The plug (6) is made from a polymeric material that is selected according to the given application for which the machine foot (1) is to be used.

In a preferred embodiment the plug (6) is circular.

The thickness of the plug (6) is less than the thickness of the surrounding polymeric material (5). Hereby is ensured that the plug does not come into direct contact with the surface of the foundation, whereupon the machine foot (1) is to be placed.

This has importance as the polymeric material (5) fitting around the plug can have a stronger attachment to the housing (4) than possible for the plug (6), so when the thickness of the plug (6) is less than the thickness of the surrounding polymeric material (5), it will be the surrounding polymeric material (5) and not the plug (6) that is mechanically influenced by the support.

In the area within the ring-shaped contact surface (8), between the plug (6) and the housing (4), is placed a cover plate (7), which preferably is made from a metallic material.

The top part (3) is attached to the housing (4) of the lower part (2) with a bolt (19), the head (18) of which is covered by the cover plate (7).

The bolt (19) gives the machine foot (1) the necessary tension strength for example for earthquake endangered areas, which is especially required, when a machine foot (1) is bolted to the support.

The common threaded faces of the bolt (19) and the top part (3) are provided with a glue.

By using a special thread-glue is can be ensured that the bottom part (2) has a robust and stable tensioning to a top part (3).

Figure 2:
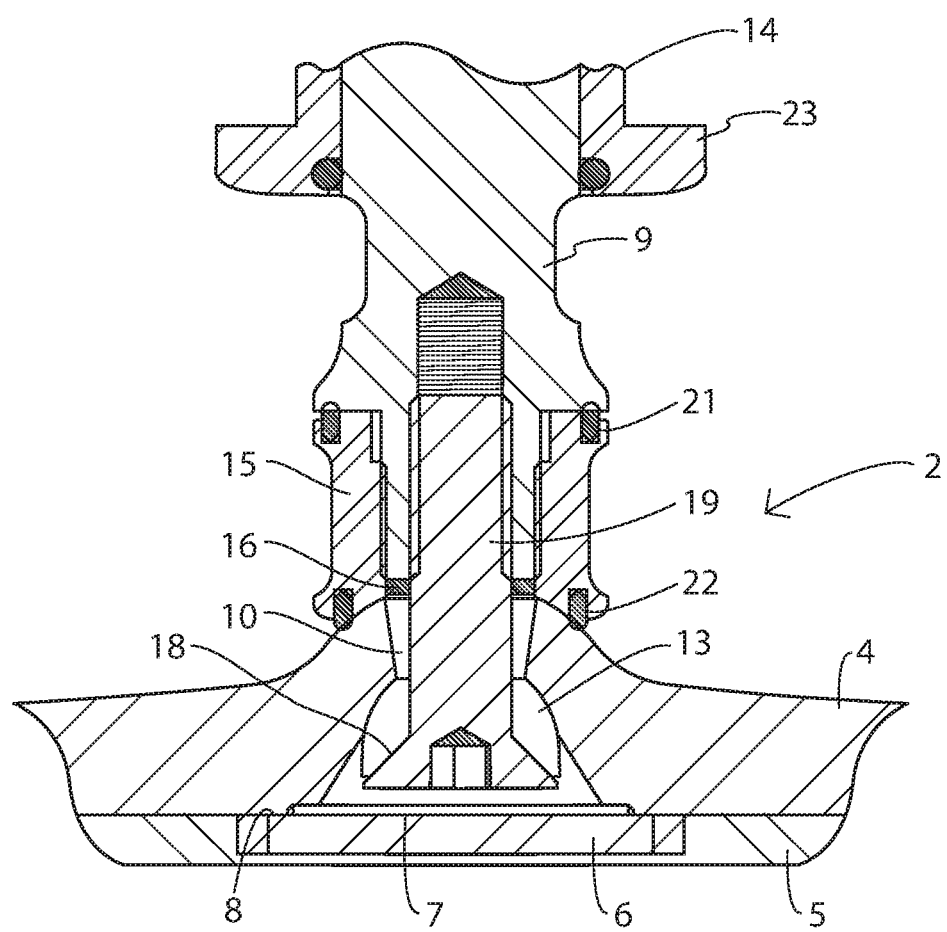
FIG. 2 shows a section of a sectional view of a machine foot.

On FIG. 2 is as indicated by 10 shown a clearance zone, which allows that the bolt (19) and thus the top part (3) is movable in relation to the housing (4) in the lower part (2).

On FIGS. 1 and 2 is as indicated with (15) shown a lock nut, which is a part of the top part (3) and which is mounted in a thread (24) on the spindle (9) and has an abutment complementary shaped to the corresponding surface part of the housing (4), which abutment forms a section of a sphere.

Between the head (18) of the bolt (19) and the housing (4) is placed a partly spherical ring (13) the center of which is the center of rotation for the movement of the top part (3) in relation to the lower part (2).

The partly spherical ring (13) is complementary in shape to the corresponding surface part of the housing (4), which together with among others clearance zone (10) and the partly spherical abutment between the lock nut (15) and housing (4) ensures that the top part (3) is movable a number of degrees (11), which in FIG. 3 is shown as plus minus 10 degrees in relation to the center axis of the bottom part (20).

Clearance zone (10) consists of a cavity delimited on the outer side of the housing (4) and on the inner side of the bolt (19). The cavity is thus ring-shaped and the outer delimitation is preferably conic.

The lock nut (15) ensures that the spindle (9) and thus the entire top part (3) can be locked both in rotation and in angle in relation to the lower part (2). When the lock nut (15) is open it turns with the spindle (9), when this is turned, and when the lock nut is tightened the spindle (9), and thus the entire top part (3), is locked, both in rotation and in angle in relation to the lower part (2). When the lock nut (15) is tightened, the friction between the lock nut (15) and the housing (4) will detain the top part (3) in relation to the lower part (2).

The lock nut (15) has two gaskets, where the first gasket (21) is placed between the top part (3) and the lock nut (15), and where the second gasket (22) is placed between the housing (4) and the lock nut (15). Together these gaskets (21, 22) ensure that no dirt and bacteria can enter into the machine foot (1) around the lock nut (15). The gaskets (21, 22) maintain their function of preventing dirt and bacteria from entering the machine foot (9) at the lock nut (15) no matter which position the lock nut (15) is in, and can thus meet hygiene standards.

In a preferred embodiment the polymeric material (5) is rubber attached to the housing (4) by vulcanization.

Hereby is it ensured that the attachment of the polymeric material (5) to the housing (4) is optimal, just as the attachment ensures that dirt and or bacteria cannot enter into the machine foot (1) via the bottom.

In the shown preferred embodiment the lower part (2) is provided with a number, preferably two holes (12), for attachment of the machine foot (1) to a foundation, which often is a requirement in areas having risk of earthquakes.

All gaskets in the machine foot, including the two gaskets (21, 22) that are placed at the lock nut, consist of FDA approved NBR rubber material.

All metal objects of the machine foot are in electric contact, as they either are screwed together or have direct metallic contact under pressure, and thus have the same potential, whereby it is avoided that potential differences arises and resulting possibilities for sparks.

As mentioned the invention comprises use of the above-mentioned machine foot (1) at locations having high hygiene standards, such as locations for processing foodstuffs or manufacturing of medicine.

Including use of the above-mentioned machine foot (1) in areas having risk of earthquakes.

The thread shield (14) can be provided with a welding flange (23) placed at the bottom of the thread shield (14). This welding flange (23) can be welded directly on a device including a machine, which is to be supported and allows a smaller distance between foundation and machine compared to if the machine is screwed directly onto the spindle (9), which reduces the risk of column deflection, as the free part of the spindle (9) thus is shorter.

The supported machine can be adjusted up and down by turning the spindle (9), while the lower part (2) stands firmly on the foundation. When the spindle (9) is turned the lock nut (15) turns with it. When the correct height is set the lock nut (15) is tightened, so that the spindle (9) is locked in both rotation and in angle in relation to the lower part (2).

The spindle (9) rests on the lower part (2) over a well-defined outer surface, which forms a sector of a sphere. The center of this partly spherical shape is inside the foot, and around this same center there is an interior partly spherical shape, wherein the partly spherical ring (13) is embedded. Spindle (9) is fastened to the lower part (2) by means of the bolt (19), which via the hole in the partly spherical ring (13), enters up into a threaded hole in the spindle (9). There can be a thin preferably polymeric anti-friction disc (16) placed between spindle (9) and lower part (2), so that there is no galling of the materials.

It is thus evident from the above-mentioned and FIGS. 1 to 4 that it is a special feature of the invention that the top part (3) is provided with a lock nut (15), where the lock nut (15) has an abutment complementary shaped to the housing (4) of the lower part (2), which abutment form a section of a sphere, and where the top part (3) is attached to the housing (4) with a bolt (19), where there between the head (18) of the bolt (19) and the housing (4) is placed a partly spherical ring (13), whose center is the center of rotation for the movement of the top part (3) in relation to the lower part (2), and whose center is coincident with the center of the partly spherical shape between the lock nut (15) and housing (4). There are furthermore gaskets (21, 22) at the lock nut (15) that ensure that dirt and bacteria do not enter around the lock nut (15), so that locking of angle and rotation can meet hygiene standards.

It is a part of the invention that the described machine foot (1) is used at locations having high hygiene standards, such as locations for processing foodstuffs or manufacturing of medicine, including in areas having risk of earthquakes.

The invention claimed is:

1. A machine foot, comprising:
   a top part for attachment in a device, and having a threaded spindle, a thread shield and a lock nut mounted in a thread of the threaded spindle; and
   a lower part for contacting against a foundation, and having a housing;
   wherein a center axis of the top part is movable a number of degrees in relation to a center axis of the lower part;
   wherein the lock nut has an abutment complementary shaped to an exterior surface of the housing of the lower part, which abutment forms a section of a sphere; and
   wherein a first gasket is positioned between the threaded spindle and the lock nut, and a second gasket is positioned between the housing and the lock nut.

2. The machine foot according to claim 1, wherein the lock nut comprises means that are adapted to lock the angle between the center axis of the top part in relation to the center axis of the lower part, which means comprises the complementary shaped abutment against the housing and a friction provided between the lock nut and the housing.

3. The machine foot according to claim 1, wherein the lock nut comprises means that are adapted to lock the rotation of the top part in relation to the lower part, which means comprises the complementary shaped abutment against the housing and a friction provided between the lock nut and the housing and a friction provided between the lock nut and the thread of the spindle.

4. The machine foot according to claim 1, wherein the top part is attached to the housing with a bolt, wherein between a head of the bolt and the housing is placed a partly spherical ring, the center of which is the center of rotation for the movement of the top part in relation to the lower part.

5. The machine foot according to claim 4, wherein there is a clearance zone between the bolt and the housing in the lower part, which clearance zone is formed by a cavity, which is delimited on the outer side of the housing and on the inner side of the bolt.

6. The machine foot according to claim 1, wherein the thread shield is provided with a welding flange placed at the bottom of the thread shield.

7. The machine foot according to claim 1, wherein the lower part is provided with a number of holes, preferably two holes for attachment of the machine foot to a foundation.

8. The machine foot according to claim 1, wherein an anti-friction disc is placed between the housing and the spindle.

9. Use of the machine foot according to claim 1 at locations having high hygiene standards.

10. Use of the machine foot according to claim 1 in areas having risk of earthquakes.

11. Use of the machine foot according to claim 1 at locations for processing foodstuffs.

12. Use of the machine foot according to claim 1 at locations for manufacturing of medicine.

* * * * *